United States Patent [19]
Sugimoto et al.

[11] Patent Number: 4,934,577
[45] Date of Patent: Jun. 19, 1990

[54] GUIDE POST FOR MAGNETIC TAPES

[75] Inventors: Toshiaki Sugimoto; Mayumi Endou; Isamu Kaneko, all of Kawaguchi, Japan

[73] Assignee: Dai-ichi Seiko Kabushiki Kaisha, Kawaguchi, Japan

[21] Appl. No.: 290,687

[22] Filed: Dec. 27, 1988

[30] Foreign Application Priority Data

Dec. 28, 1987 [JP] Japan ................. 62-332753

[51] Int. Cl.$^5$ .......................... B65H 27/00
[52] U.S. Cl. ........................ 226/196; 242/76
[58] Field of Search ............... 226/186, 189, 190, 193; 242/76, 196; 360/130.2, 130.21, 130.22, 132

[56] References Cited

U.S. PATENT DOCUMENTS

| | | | |
|---|---|---|---|
| 4,389,010 | 6/1983 | Oishi et al. ................. | 226/196 |
| 4,635,877 | 1/1987 | Oishi et al. ................. | 242/76 X |
| 4,751,601 | 6/1988 | Roos et al. ................. | 226/196 X |
| 4,789,114 | 12/1988 | Tanaka ..................... | 242/76 X |

FOREIGN PATENT DOCUMENTS 60-28063  2/1985  Japan.
63-49303  10/1988  Japan.

*Primary Examiner*—Joseph J. Hail, III
*Attorney, Agent, or Firm*—Nils H. Ljungman

[57] ABSTRACT

A guide post for magnetic tapes manufactured by injection molding of a composite material prepared by mixing a thermoplastic resin used as a basic ingredient with an electrically conductive carbon black and a spherical silicon resin. This guide post can exhibit characteristics equivalent to those of the metal guide post owing to the function of the electrically conductive carbon black and the spherical silicon resin. The composite material can further contain a solid lubricant mixed therewith.

4 Claims, 1 Drawing Sheet

| | NO. | PARTS/100 PARTS OF DURACON M270 (BY WEIGHT) | | | CHARACTERISTICS | | | CHARACTERISTICS AFTER REPEATING 100 FAST FEED AND 100 REWINDING OPERATIONS AT -5°C IN DRY CONDITION | | OVERALL EVALUCATION |
|---|---|---|---|---|---|---|---|---|---|---|
| | | KETJENBLACK | TOSPEARL | MOLYBDENUM DISULFIDE | SURFACE RESISTANCE (Ω) | SURFACE ROUGHNESS (Rz) | DYNAMIC FRICTION COEFFICIENT | DYNAMIC FRICTION COEFFICIENT | TAPE DAMAGE | |
| EMBODIMENTS | 1 | 5.0 | 1.0 | — | $4.3 \times 10^{10} \sim 1.2 \times 10^{10}$ | 0.5(μ) | 0.14 | 0.22 | △~○ | △ |
| | 2 | 5.5 | 1.0 | — | $9.2 \times 10^9 \sim 7.3 \times 10^9$ | 0.5 | 0.14 | 0.22 | △~○ | △ |
| | 3 | 6.0 | 1.0 | — | $2.1 \times 10^6 \sim 1.2 \times 10^6$ | 0.6 | 0.15 | 0.16 | ○ | ○ |
| | 4 | 6.5 | 1.0 | — | $4.0 \times 10^3 \sim 3.2 \times 10^3$ | 0.8 | 0.15 | 0.14 | ○ | ○ |
| | 5 | 6.0 | 1.5 | — | $6.6 \times 10^6 \sim 5.8 \times 10^6$ | 0.7 | 0.15 | 0.15 | ○ | ○ |
| | 6 | 6.0 | 2.0 | — | $7.3 \times 10^7 \sim 6.9 \times 10^7$ | 0.7 | 0.15 | 0.16 | ○ | ○ |
| | 7 | 5.5 | 1.0 | 0.5 | $6.3 \times 10^6 \sim 3.1 \times 10^6$ | 0.9 | 0.15 | 0.16 | ○ | ○ |
| | 8 | 10.0 | 1.0 | — | $4.1 \times 10^2 \sim 2.3 \times 10^2$ | 1.2 | 0.18 | 0.16 | △~○ | △ |
| COMPARISON EXAMPLES | 1 | 6.0 | — | — | $7.3 \times 10^6 \sim 4.1 \times 10^5$ | 1.0 | 0.20 | 0.22 | × | × |
| | 2 | 6.0 | 3.0 | — | $8.9 \times 10^6 \sim 8.1 \times 10^6$ | 1.2 | 0.17 | 0.22 | × | × |
| | 3 | 6.0 | 0.5 | — | $3.4 \times 10^6 \sim 1.3 \times 10^6$ | 0.8 | 0.15 | 0.16 | ○ | ○ |
| | 4 | 6.0 | 1.5 * | — | $5.9 \times 10^6 \sim 4.3 \times 10^6$ | 1.3 | 0.15 | 0.18 | × | × |
| | 5 | 4.5 | 1.0 | — | $5.3 \times 10^{11} \sim 3.8 \times 10^{10}$ | 0.5 | 0.14 | 0.25 | △ | × |
| | 6 | 3.0 | 1.0 | — | $7.8 \times 10^{13} \sim 6.2 \times 10^{11}$ | 0.5 | 0.14 | 0.27 | △ | |
| | 7 | 12.0 | 1.0 | — | $6.2 \times 10^2 \sim 1.2 \times 10^0$ | 1.8 | 0.21 | 0.19 | × | |

* SILICON OIL

| | NO. | PARTS/100 PARTS OF DURACON M270 (BY WEIGHT) | | | CHARACTERISTICS | | | CHARACTERISTICS AFTER REPEATING 100 FAST FEED AND 100 REWINDING OPERATIONS AT -5°C IN DRY CONDITION | | OVERALL EVALUATION |
|---|---|---|---|---|---|---|---|---|---|---|
| | | KETJENBLACK | TOSPEARL | MOLYBDENUM DISULFIDE | SURFACE RESISTANCE ($\Omega$) | SURFACE ROUGHNESS (Rz) | DYNAMIC FRICTION COEFFICIENT | DYNAMIC FRICTION COEFFICIENT | TAPE DAMAGE | |
| EMBODIMENTS | 1 | 5.0 | 1.0 | — | $4.3 \times 10^{10} \sim 1.2 \times 10^{10}$ | 0.5 ($\mu$) | 0.14 | 0.22 | △~○ | △ |
| | 2 | 5.5 | 1.0 | — | $9.2 \times 10^{9} \sim 7.3 \times 10^{9}$ | 0.5 | 0.14 | 0.22 | △~○ | △ |
| | 3 | 6.0 | 1.0 | — | $2.1 \times 10^{6} \sim 1.2 \times 10^{9}$ | 0.6 | 0.15 | 0.16 | ○ | ○ |
| | 4 | 6.5 | 1.0 | — | $4.0 \times 10^{3} \sim 3.2 \times 10^{3}$ | 0.8 | 0.15 | 0.14 | ○ | ○ |
| | 5 | 6.0 | 1.5 | — | $6.6 \times 10^{6} \sim 5.8 \times 10^{6}$ | 0.7 | 0.15 | 0.15 | ○ | ○ |
| | 6 | 6.0 | 2.0 | — | $7.3 \times 10^{7} \sim 6.9 \times 10^{7}$ | 0.7 | 0.15 | 0.16 | ○ | ○ |
| | 7 | 5.5 | 1.0 | 0.5 | $6.3 \times 10^{6} \sim 3.1 \times 10^{6}$ | 0.9 | 0.15 | 0.16 | ○ | ○ |
| | 8 | 10.0 | 1.0 | — | $4.1 \times 10^{2} \sim 2.3 \times 10^{2}$ | 1.2 | 0.18 | 0.16 | △~○ | △ |
| COMPARISON EXAMPLES | 1 | 6.0 | — | — | $7.3 \times 10^{8} \sim 4.1 \times 10^{5}$ | 1.0 | 0.20 | 0.22 | × | × |
| | 2 | 6.0 | 3.0 | — | $8.9 \times 10^{8} \sim 8.1 \times 10^{8}$ | 1.2 | 0.17 | 0.22 | × | × |
| | 3 | 6.0 | 0.5 | — | $3.4 \times 10^{6} \sim 1.3 \times 10^{6}$ | 0.8 | 0.15 | 0.16 | ○ | ○ |
| | 4 | 6.0 | 1.5 * | — | $5.9 \times 10^{8} \sim 4.3 \times 10^{8}$ | 1.3 | 0.15 | 0.18 | × | × |
| | 5 | 4.5 | 1.0 | — | $5.3 \times 10^{11} \sim 3.8 \times 10^{10}$ | 0.5 | 0.14 | 0.25 | △ | × |
| | 6 | 3.0 | 1.0 | — | $7.8 \times 10^{13} \sim 6.2 \times 10^{11}$ | 0.5 | 0.14 | 0.27 | △ | × |
| | 7 | 12.0 | 1.0 | — | $6.2 \times 10^{2} \sim 1.2 \times 10^{0}$ | 1.8 | 0.21 | 0.19 | × | × |

* SILICON OIL

GUIDE POST FOR MAGNETIC TAPES

BACKGROUND OF THE INVENTION (a) Field of the Invention

The present invention relates to a plastic guide post for magnetic tapes.

(b) Description of the Prior Art

The guide post which is used as a supply guide means for magnetic tapes accommodated in video cassettes, etc. must function so as to maintain images to be reproduced always clear while withstanding slide contact with magnetic tapes for a long time, and has conventionally been made of metals machined at high manufacturing cost. That is to say, the metal guide posts have been used widely for the merits of hardness, heat conduction property and antistatic property which are the factors for enhancing wear resistance and abrasion resistance as well as excellent precision on the surfaces thereof finished by machining, but have a serious defect that they require high machining cost.

In view of this defect, attempts have been repeated to make the guide posts of plastic materials for the purpose of reducing manufacturing cost through mass production. However, since the plastic materials are fundamentally low in heat dissipation thereof, it is undeniable that the plastic materials are low in resistance to longterm friction or abrasion especially when they are to be brought into slide contact with plastic films, and are low in surface precision as compared with machined metal guide posts. In other words, it is difficult to obtain surface roughness smaller than 1 micron by machining a plastic guide post into the same form as that of the metal guide post and, on the other hand, injection molding provides excellent surface roughness but remarkably degrades surface straightness, thereby often causing unsmooth running due to deformation or adhesion of the magnetic tape.

Further, long-term slide contact between the plastic guide post and the polyester film used as the base of the magnetic tape produces abrased powder and deformation of the magnetic tape, thereby degrading quality of reproduced images. Speaking concretely, the plastic guide post allows dropout error and production of horizontal stripes due to local demagnetization on reproduced images oftener than the metal guidepost and has a defect to make images very shabby.

Furthermore, since the plastic is originally an insulating material, it increases frictional torque due to electrical charging in a dry environment or at low temperatures, thereby making tape running unstable, imposing excessive load on the motor mounted on the deck or stopping tape running in extreme cases.

In order to correct those defects, the inventor et al proposed, in Japanese Preliminary Patent Publication No. Sho 60-28063 (Patent Publication No. Sho 63-49303), a guide post for magnetic tapes wherein tiny convexities and concavities are formed on the surface thereof for reducing friction, and electrical conductivity is imparted by using carbon fibers or the similar material as a conductive filler. However, subsequent researches have clarified that the convexities and concavities are formed by molding mostly on the edges of the end surfaces of the carbon fibers, become factors to produce flaws on the tape surface brought into contact with these convexities and concavities, and accelerate deterioration of reproduced images due to the tape damage.

Moreover, an attempt to obtain the characteristics similar to those described above by using super-fine powder of carbon black or the similar material also constitutes problems that is difficult to maintain surfaces of moldings in ideal shapes due to contamination of the mold by oil bleed at the molding stage since a liquid dispersion oil is used for mixing and kneading, and that tape damage is also caused due to adhesion of dust since the surface oil transfers to the tape.

SUMMARY OF THE INVENTION

In view of the problems described above, it is a primary object of the present invention to provide a plastic guide post for magnetic tapes which has the characteristics equivalent to those of the metal guide post and is manufacturable at low cost.

The object of the present invention is accomplished by injection molding of a composite material consisting of 100 parts by weight of a thermoplastic resin, an adequate parts by weight of an electrically conductive carbon black capable of adjusting surface resistance below $10^7 \Omega$ and 0.5 to 2.5 parts by weight of a spherical silicon resin.

According to a preferred formation of the present invention, the guide post for magnetic tapes is obtained by injection molding of a composite material consisting of 100 parts by weight of a thermoplastic resin, 5 to 10 parts by weight of a carbon black, 0.5 to 2.5 parts by weight of a spherical silicon resin and a solid lubricant. Tiny convexities and concavities favorable for running the magnetic tapes are formed and antistatic property is imparted on the surface of the guide post made of this material.

In the present invention, as the thermoplastic resin or basic ingredient, is used POM (polyoxymethylene), PA (polyamide), PBT (polybutylene terephthalate), PPS (polyphenylenesulfide), PES (polyethersulfone), PEL (polyether imide), PEEK (polyether ketone), PI (polyimide) or the similar compound having excellent lubricity.

In the present invention, as the agent to impart the electrical conductivity, is used a carbon black such as Ketjen Black (trade mark) or Acetylene Black (trade mark). The surface resistance should desirable by lower than $10^7 \Omega$ so as to prevent charging even in a low-temperature or dry environment and experiments indicated that the carbon black should be added at a ratio of at least 5%, in case of Ketjen Black EC (trade mark), to meet this requirement. However, this addition ratio can be lowered by using Ketjen Black of grades having higher electrical conductivities (for example, Ketjen Black EC 600 JD). In order to form a surface allowing the magnetic tape to run stable, on the other hand, it is necessary to restrict addition ratio of carbon black. Speaking concretely, it is necessary to maintain fluidities of molding compounds at least 5 in MFR (melt flow rate of resin) in order to reduce molding cost with the molds and molding machines having the most general constructions, not with a mold having a complicated construction or a special injection molding machine. Experiments indicated that it is necessary to limit filling ratio of the carbon black below 10% in order to meet this requirement.

Judging from the results of the experiments described above, the carbon black should be added within an optimum range from 5.0% to 10% in order to accomplish the object of the present invention. Furthermore, a liquid oil is conventionally used for dispersing fine powder of the carbon black uniformly in a resin as disclosed, for example, by Japanese Preliminary Patent Publication No. Sho 61-129783. However, it was confirmed by experiments that this oil adheres to a mold, produces deposits and deteriorates shape of the surface of molding, or oozes out of a molding, adheres to a running tape and attracts dust, thereby accelerating deterioration of the tape. The inventor et al found that hardened fine spherical silicon resins, for example Tospearl (trade mark) prepared by Toshiba Silicon Co., Ltd., have the lubricity inherent in silicon and are usable effectively as the solid filler dispersant capable of solving the above-mentioned problems, and that the hardened fine spherical silicon resins are unique compounds having an additional characteristic to form adequate small convexities and concavities having lubricity on the surfaces of moldings. It is preferable to select addition ratio of the spherical silicon resin within a range from 0.5 to 2.5 parts by weight.

In addition, it is possible to add an adequate amount of solid lubricant stabilize lubricity. For example, it is preferable to add 0.2 to 1.0 part by weight of molybdenum disulfide as the solid lubricant.

Rolls of the materials selected for the blend design described above can be summarized as follows:

(a) The carbon black imparts electrical conductivity to the guide post and reduces charging due to friction with tapes.

(b) The spherical silicon resin serves as the carbon black dispersant and also as the agent to form small convexities and concavities having lubricity on the surface for stabilizing tape running.

(c) The solid lubricant makes tape running more stable.

Accordingly, it has become possible, by injection molding of the composite material prepared by the blend design described above, to provide a plastic guide post for magnetic tapes which is manufacturable at low cost, capable of withstanding all environmental conditions unlike the conventional plastic guide posts for magnetic tapes and having characteristics equivalent to those of the metal guide posts.

This and other objects as well as the features and the advantages of the present invention will become apparent from the following detailed description of the preferred embodiments.

BRIEF DESCRIPTION OF THE DRAWING

The accompanying drawing is a table listing characteristics of the plastic guide post for magnetic tapes according to the present invention.

DESCRIPTION OF THE PREFERRED EMBODIMENTS

A copolymeric resin (Duracon (trade mark) M270, prepared by Polyplastics Co., Ltd.) used as the polyacetal resin was blended with Ketjen Black EC (prepared by Japan Ketjen Black International Co., Ltd., having a mean particle size of 30 m$\mu$) and a hardened spherical silicon resin (Tospearl having a mean particle size of 2 m$\mu$) at the ratios listed in the above table as the Embodiments 1 through 8 and preliminarily mixed with a supermixer, whereafter an injection molding pellet was prepared by uniformly mixing, kneading and extruding at 190° to 200° C. with a 50 mm$\phi$ single spindle extruder. A tape guide post for VHS cassette was molded by using the pellet and its characteristics are summarized in the accompanying drawing.

As the comparison examples 1 through 7, pellets were prepared in the same processes as those of the above-mentioned Embodiments by dispersing Ketjen Black singularly in the polyacetal, adding Tospearl at higher ratios and using silicon oil as the dispersant for carbon black respectively. Molding similar to those obtained in the Embodiments were manufactured and characteristics of the moldings are also listed in the above table.

Comparing the comparison example 1 with the Embodiments 3 through 6 for checking effect of Tospearl as the dispersant, it will be understood that surface resistance is remarkably variable when Tospearl is not added. Accordingly, agglomerates of carbon are formed in spots on the surfaces of the moldings, thereby making the surfaces rough, raising coefficient of friction, increasing tape damage during running especially in severe low-temperature condition, accelerating deterioration of reproduced images and making the tape guide posts unusable in practice.

On the other hand, the Embodiments 3 through 6 clarify that the addition of Tospearl makes it possible to maintain stable surface resistance owing to uniform dispersion of the carbon black. In addition, it has been found out that the magnetic tape can run stably even in strict environmental conditions owing to Tospearl used as the spherical self lubricating filler which exhibits its effect of for forming surfacial convexities and concavities suited for tape running.

Further, checks of addition limit for Tospearl (comparison of the Embodiments 4 through 6 with the comparison examples 2 and 3) have indicated that addition of 0.5 or higher part by weight of Tosperal can meet the minimum requirements for dispersion and surface formation, and that the addition of Tospearl has a certain upper limit since total filler addition ratio has a certain limit beyond which surface roughness would be deteriorated and surface resistance would be raised. Judging from those facts, preferable filling ratios of Tospearl lie within a range from 0.5 to 2.5 parts by weight relative to 100 parts by weight of resin. Needless to say, the present invention is not limited to the above-mentioned addition range of Tospearl since adequate surface roughness is variable dependent on types of tapes and surfaces having higher roughness may be suited for certain types of tapes.

As for the addition of Ketjen Black, optimum ratios were found out in the Embodiments as described below:

As is understood by comparing the Embodiments 1 through 4 and 8 with the comparison examples 5 through 7, the inventor et al already found out by preliminary experiments that surface resistance below $10^7$ $\Omega$ is suited for preventing a running tape from being electrically charged and knew by the subsequent experiments that 5.0 to 10.0 parts by weight of Ketjen Black, preferably 5.5 to 7.0 parts by weight of Ketjen Black, corresponds to the above-mentioned surface resistance. In addition, it was proved that surface resistance of $10^9$ to $10^{10}$ $\Omega$ can exhibit certain effect at normal temperature and normal humidity, but remarkably degrades performance of the guide posts under severe friction with running tapes in dry conditions.

Furthermore, an oil-modified silicon oil was mixed and kneaded as a carbon black dispersant in the ordinary process in the comparison example 4. It will be understood that carbon black is dispersed uniformly in the resin and surface resistance is stabilized as is known well when an oil is used as a dispersing agent.

However, it was found out that the oil-modified silicon oil is not suited to accomplish the object of the present invention since the oil roughens, when used in a magnetic tape running system, the surface of molding due to contamination of the mold by oozing oil as well as coagulation and adhesion of the oil during repeated molding stages, thereby resulting in tape damage, and oozes out to the surface even after the molding stage and adheres also to the tape base, thereby forming thin insulating layers on both the surfaces, allowing dust adhesion, constituting a cause for producing flaws on running tapes and reducing the effect of the carbon black filled at high ratios for preventing charging due to friction.

Moreover, molybdenum disulfide was added as the solid lubricant in the Embodiment 7. The present invention is not incompatible with use of the existing solid lubricants.

As is understood from the foregoing description, it was found out that the tape guide post manufactured by using the composite material according to the present invention as the basic ingredient has the performance equivalent to that of the guide post made of stainless steel and permits reduction of manufacturing cost owing to the mass productivity inherent in the plastics.

What is claimed is:

1. A guide post for magnetic tapes formed by injection molding of a composite material prepared by adding at most 10 parts by weight of an electrically conductive carbon black powder imparting surface resistance of $10^7 \Omega$ or lower and 0.5 to 2.,5 parts by weight of a spherical silicon resin to 100 parts by weight of a thermoplastic resin.

2. A guide post for magnetic tape formed by injection molding of a composite material prepared by adding 5 to 10 parts by weight of an electrically conductive carbon black powder, 0.5 to 2.5 parts by weight of a spherical silicon resin and 0.5 to 1.0 part by weight of a solid lubricant to 100 parts by weight of a thermoplastic resin.

3. A guide post for magnetic tapes according to claim 1 or 2 characterized in that said thermoplastic resin is polyacetal.

4. A guide post for magnetic tapes according to claim 2 wherein the solid lubricant comprises molybdenum disulfide.

* * * * *